July 20, 1965 M. C. THOMSON 3,195,625
HEAT EXCHANGER PLATE AND SEAL
Filed Nov. 8, 1961 2 Sheets-Sheet 2

INVENTOR.
MEREDITH C. THOMSON
BY
*Bayard H. Michael*
ATTORNEY

United States Patent Office 3,195,625
Patented July 20, 1965

3,195,625
HEAT EXCHANGER PLATE AND SEAL
Meredith C. Thomson, 335 W. 2nd St., Oconomowoc, Wis.
Filed Nov. 8, 1961, Ser. No. 151,036
7 Claims. (Cl. 165—166)

This invention relates to plate-type heat exchangers and particularly to provision of an improved gasket arrangement for such heat exchangers.

Plate-type heat exchangers customarily employ a number of heat exchanger plates which are suitably ported so as to direct flow across the face of the plate within an area bounded by suitable gaskets which cooperate with an adjacent plate to define the flow path. The individual plates are assembled in a stack which is compressed to secure a seal between the gaskets and the adjacent plates. As the name implies, these exchangers are subjected to heat in operation and the pressures encountered can be considerable. This combination of heat and internal pressure has a marked tendency to peel the gasket material from the plate. When the gasket is so peeled from the plate a factory repair job is indicated and this, of course, occasions inconvenience for the user.

The primary object of this invention is to overcome the difficulties in connection with the gasketing of plate-type heat exchangers and to provide a simple highly efficient gasket arrangement which can withstand considerably higher pressures than presently available exchangers.

A further object is to provide a gasket arrangement which permits of simple field replacement of any gasket which may become damaged.

This has been accomplished by mounting the gasket on an encircling rigid member which acts to back up the gasket when the gasket is placed under pressure. The gasket when so mounted and sandwiched between two plates is so positioned that the higher the tinternal pressure of the heat exchanger the greater will be the sealing force. This fact coupled with the fact that the loading on the gasket cannot act to shear the gasket from its mount makes an extremely durable and reliable gasket arrangement having a service life far greater than prior gasket arrangements.

Other objects and advantages will be pointed out in, or be apparent from, the specification and claims, as will obvious modifications of the various embodiments shown in the drawings, in which:

Figure 1:
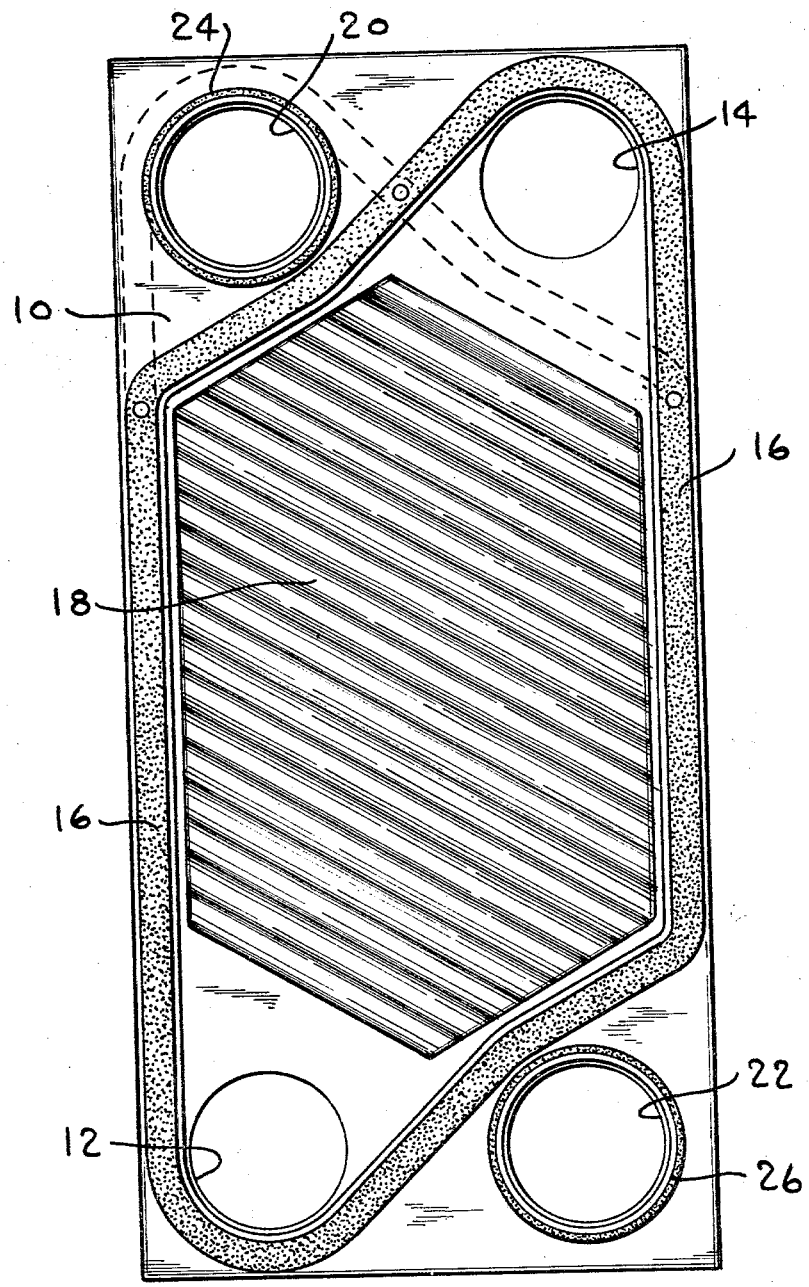
FIG. 1 is a plan view of a representative plate with the shaded areas denoting the areas usually gasketed.

It should be understood that the sample plate shown in FIG. 1 is merely to be taken as representative of the type of gasketing which may be encountered in connection with a plate-type heat exchanger. Other gasket arrangements are also employed and this invention is applicable with respect to such arrangements. The plate 10 illustrated in FIG. 1 is provided with ports 12 and 14 surrounded by a gasket area 16 so that when the plates are brought together in assembly in an exchanger flow is directed between ports 12 and 14. This would generally pass over a generally corrugated area 18 to increase turbulence and contact area. The particular plate illustrated additionally includes ports 20, 22 which are respectively gasketed at areas 24, 26 to provide for flow directly through the plate rather than making a so-called pass across the face of the plate.

Figure 2:
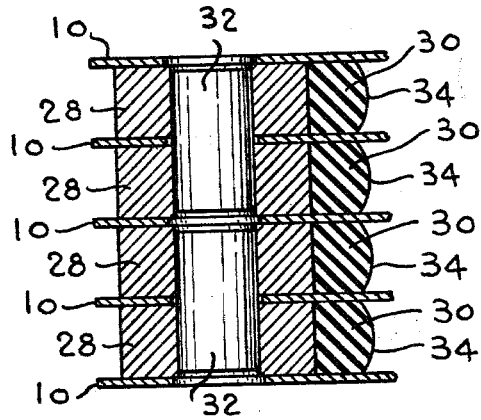
FIG. 2 is a fragmentary section through a stack of plates showing the manner in which the gaskets are arranged with respect to the plates and sandwiched therebetween.
Figure 3:
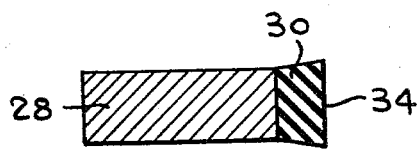
FIG. 3 shows a representative type of construction which may be used in mounting the gasket to the peripherally encircling metal plate.

In the past the various shaded areas have been provided with gasket material bonded to the plate and since the pressure on the inside of each shaded area is greater than atmospheric there has always been a tendency to peel or rip the gasket material from the metal plate. This coupled with rather elevated operating temperatures combined to shorten the service life of the gasket. By way of overcoming this objection I have eliminated the gasket integrally bonded to the face of the plate and use in place of such an arrangement a rigid metal member 28 adapted to generally overlie the plate in the shaded areas. This ring 28 has a suitable gasket 30 bonded to the inside face of the ring as shown in FIG. 3. When a plurality of these plates and rings are stacked they may be located in proper relationship by roll pins 32 as illustrated in FIG. 2. Any other suitable locating means may be employed with the nature of the locating means being somewhat dependent upon whether frequent disassembly of the exchanger is indicated. If the assembly is equipped to be cleaned "on the line" then the means can be of a somewhat permanent nature whereas if frequent disassembly for cleaning purposes is required then suitable screw bolts or the like may be employed. The ring can in some cases be welded or otherwise permanently secured to the plate. In addition to these pins the entire assembly is, of course, compressed between the customary header and follower and the plates are preferably held in metal-to-metal contact with the opposite planar faces of the rigid members so that the rigid members engage and support the plate edges over a substantial peripheral area for a purpose which will be discussed more completely hereinafter. As can be seen in FIG. 3 the inside face 34 of gasket 30 is thicker than the ring 28 which means that the gasket itself will be compressed as the stack is compressed. This insures a good initial seal between the adjacent plates 10. Since the gasket is facing the pressure it is obvious that increasing pressure will tend to compress it thereby obtaining an ever greater sealing force. Obviously, there is no possibility of the gasket being peeled from the vertically disposed inside face of ring 28.

Figure 4:
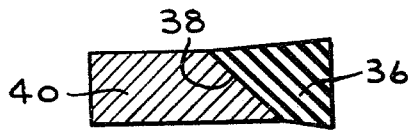
FIG. 4 shows another gasket to plate construction.

Bonding gasket 30 to the generally vertical inside face of ring 28 presents some problems by way of fabrication and possibly a simpler approach is that illustrated in FIG. 4 where gasket 36 is beveled to cooperate with the beveled face 38 of ring 40 and permit of easier assembly for the bonding operation.

Figure 5:
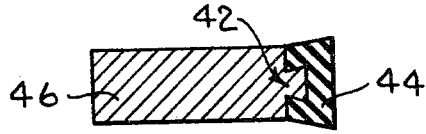
FIG. 5 shows a gasket to plate type construction which would permit of the gasket being snapped onto the encircling plate rather than being bonded to the plate.

All bonding can be eliminated by the construction shown in FIG. 5 where a dove-tailed joint 42 is employed between gasket 44 and the ring 46. With this arrangement the gasket can be snapped in the ring.

Figure 6:
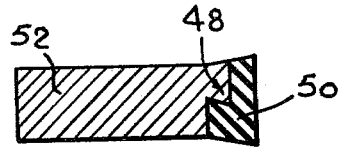
FIG. 6 shows another type snap-on gasket arrangement.

FIG. 6 shows what amounts to half of a dove-tailed joint 48 allowing gasket 50 to be snapped in ring 52.

In all of the foregoing constructions the inside face of the gasket is somewhat thicker than the ring to which the gasket is secured to thereby obtain the initial sealing force. Having thus obtained the initial sealing force the increases in internal pressure will act to further increase the sealing force. The metal ring serves as a backing preventing pressure blow-out of the gasket and substantially increasing the pressure handling capacities of the gasket while at the same time serving to limit the degree of initial compression of the gasket and form a metal-to-metal engagement between the rings and the plates to reduce the amount of flexing at the plate edges due to bowing or warpage of the plates during operation. The limiting of compression by the rings relieves the corrugations of this function and this, in turn, eliminates the tendency to warp the plates as the compression load on the corrugations is increased. Thus, the ring serves the two important functions of limiting compression and preventing pressure blow-out of the gasket. In all cases the gasket should be designed so pressure acts to increase the seal force and there should be some means to limit the movement of the plates towards each other. By proper design the seal is preloaded when the plate stack is compressed.

Figure 7:
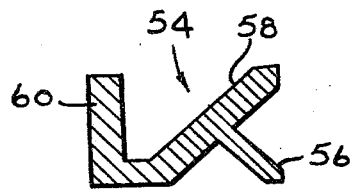
FIG. 7 shows another type of seal fixed to a plate.
Figure 8:
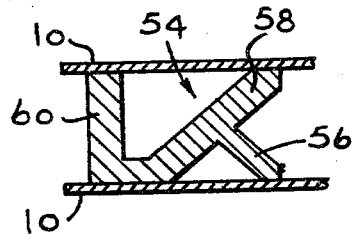
FIG. 8 shows the seal of FIG. 7 as it is compressed in use.

The seal member 54 shown in FIG. 7 is a metallic member having adequate elasticity or resiliency to effect the seal as described below. This seal is either welded or otherwise fixed to the plate 10 so that in the process the lower leg 56 is slightly deformed upwardly to insure an initial contact between the leg and the face of the plate. It will be noted in FIG. 7 that the upper divergent leg 58 projects somewhat above the top of the vertical compression leg 60. The compression leg, when the plates are stacked together, is subjected only to compressive force and will not deflect and, hence, acts to limit the compression or deflection of the upper deformable leg 58 to the position shown in FIG. 8. Pressure now acting to the right of this seal will tend to move legs 56 and 58 outwardly so as to achieve a greater sealing force as the pressure increases. This modification carries forth the idea of limiting the degree of deformation or preloading of the seal member while insuring an initial sealing force which will be increased as the pressure acting on the seal member increases.

With respect to the foregoing description the gasket surrounding the pass area 18 has been discussed. It is, of course, obvious the same gasket arrangement can be employed surrounding the port areas 20, 22. Although various embodiments of the present invention have been illustrated and described, it will be apparent to those skilled in the art that various changes and modifications may be made therein without departing from the spirit of the invention or from the scope of the appended claims.

I claim:

1. A plate-type heat exchanger assembly including a plurality of plates each having a pass area, a gasket surrounding the pass area of each plate and disposed between adjacent plates so as to define a flow path between the plates and gasket, said gasket being rigidly secured to and forming a generally unitary assembly with a rigid member surrounding the outer periphery of the gasket, said rigid member having oppositely facing planar faces arranged in metal-to-metal contact with each pair of adjacent plates and forming with said plates a rigid metal-to-metal stacked arrangement of said plates and said rigid members, and means engaging at least the outer opposite faces of said rigid stack to exert a clamping force on the alternate plates and rigid members in said rigid stack to obviate flexing of said plates at the seal areas during operation and also passing through said rigid members and the adjacent plates to locate said rigid members and the adjacent plates with respect to each other.

2. The assembly according to claim 1 in which the gaskets are initially compressed by assembly of the exchanger and wherein each of said rigid members extend coextensively over the outer periphery of each of said gaskets to provide a rigid backing therefor so that internal pressure in the pass area further increases the seal force between the gasket and the adjacent plates.

3. An assembly according to claim 1 in which a portion of each gasket when not compressed is thicker than the rigid member to which the gasket is secured and said rigid members completely fill an area between adjacent plates to provide a rigid backing over the entire outer periphery of said gaskets.

4. An assembly according to claim 1 in which the gaskets are so dimensioned with respect to the thickness of the rigid members that the gaskets are initially compressed upon assembly of the exchanger, and including means for fixing the location of the gaskets with respect to the pass area.

5. An assembly according to claim 1 in which the gaskets are bonded to the rigid members.

6. An assembly according to claim 1 in which each gasket releasably interlocks with each rigid member in a dove-tail type connection so that said gaskets form a unitary assembly with said rigid members.

7. A plate-type heat exchanger assembly including a plurality of plates each having a pass area, a deformable gasket surrounding the pass area of each plate, rigid means disposed between and filling a substantial area between each pair of adjacent plates to determine the minimum spacing between and to form a rigid metal-to-metal stacked arrangement of said plates and rigid means, connecting means engaging at least the outer opposite faces of said rigid stack to exert a clamping force on the alternate plates and rigid means in said rigid stack to obviate flexing of said plates at the seal areas during operation, each of said deformable gaskets having a relaxed thickness greater than said minimum spacing and being disposed inwardly of said rigid means toward said pass area so that the pressure in said pass area reacts on said deformable gasket to increase the seal force.

References Cited by the Examiner

UNITED STATES PATENTS

| | | | |
|---|---|---|---|
| 1,961,660 | 6/34 | Fehrmann | 165—166 |
| 2,191,044 | 2/40 | Seligman | 165—167 |
| 2,379,671 | 7/45 | Wetherby Williams | 165—167 |
| 2,814,469 | 11/57 | Hytte | 165—167 |

FOREIGN PATENTS

| | | |
|---|---|---|
| 65,461 | 3/47 | Denmark. |
| 726,065 | 2/32 | France. |
| 493,490 | 10/38 | Great Britain. |

CHARLES SUKALO, *Primary Examiner.*
PERCY L. PATRICK, *Examiner.*